US007171055B2

(12) United States Patent
Morton

(10) Patent No.: US 7,171,055 B2
(45) Date of Patent: Jan. 30, 2007

(54) PARAMETRIC MEANS FOR REDUCING ALIASING ARTIFACTS

(75) Inventor: Roger R. A. Morton, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 717 days.

(21) Appl. No.: 10/422,099

(22) Filed: Apr. 24, 2003

(65) Prior Publication Data

US 2004/0213479 A1  Oct. 28, 2004

(51) Int. Cl.
G06K 9/40 (2006.01)
G06K 9/00 (2006.01)
(52) U.S. Cl. .................................. 382/269; 382/275
(58) Field of Classification Search ................ 382/167, 382/254, 260–264, 269, 275, 294; 348/97, 348/104, 241, 342, 335; 358/518; 359/571, 359/640
See application file for complete search history.

(56) References Cited

U.S. PATENT DOCUMENTS

| 4,989,959 | A | * | 2/1991 | Plummer | 359/640 |
| 5,166,783 | A | | 11/1992 | Hodgson | 358/54 |
| 5,322,998 | A | * | 6/1994 | Jackson | 250/216 |
| 5,467,412 | A | | 11/1995 | Capitant et al. | 382/167 |
| 5,576,837 | A | * | 11/1996 | Strolle et al. | 386/33 |
| 5,682,266 | A | * | 10/1997 | Meyers | 359/571 |
| 6,040,857 | A | * | 3/2000 | Hirsh et al. | 348/241 |
| 6,424,749 | B1 | * | 7/2002 | Zhu et al. | 382/260 |
| 6,937,283 | B1 | * | 8/2005 | Kessler et al. | 348/342 |
| 7,103,235 | B2 | * | 9/2006 | Tener et al. | 382/294 |
| 2003/0007699 | A1 | | 1/2003 | Trifonov et al. | |
| 2004/0213479 | A1 | * | 10/2004 | Morton | 382/269 |
| 2004/0213480 | A1 | * | 10/2004 | Morton | 382/269 |

OTHER PUBLICATIONS

U.S. Appl. No. 10/422,457, filed Apr. 24, 2003, Roger R.A. Morton.
"Probabilistic anti-aliasing methods for dynamic variable resolution images" by Francesco M. Panerai and Richard D. Juday. SPIE vol. 2847, pp. 130-138.
"The Impact of Aliasing and Quantization on Motion Compensation" by Christoph Stiller. INRS-Telecommunications, 16 Place du Commerce, Verdun, Quebec H31 1H6 Canada, pp. 209-214.

(Continued)

*Primary Examiner*—Amir Alavi
(74) *Attorney, Agent, or Firm*—David M. Woods

(57) ABSTRACT

A method for reducing the visibility of sub-Nyquist aliasing artifacts in an image, where the image is produced in a scene-to-output imaging system that is represented by a modulation transfer function, includes the steps of: (a) providing a source image signal as an input image having sub-Nyquist aliasing artifacts, where image content is represented by an image frequency response and a frequency response amplitude; (b) determining a preferred aliasing ratio by utilizing an aliasing equation that depends on image frequency and pixel count of the imaging system; and (c) adjusting the frequency response amplitude of the image signal for image frequencies corresponding to the preferred aliasing ratio so as to correspondingly adjust the modulation transfer function of the scene to output system to maintain the preferred aliasing ratio while reducing the frequency response amplitude, thereby providing an image with reduced visibility artifacts.

6 Claims, 4 Drawing Sheets

OTHER PUBLICATIONS

"Spatial summation properties of directionally selective mechanisms in human vision" by Stephen J. Anderson and David C. Burr. J. Opt. Soc. Am. A, vol. 8, No. 8, Aug. 1991, pp. 1330-1339.

"Interaction of Image Quality Metrics" by Roger R. A. Morton, Michelle A. Maurer, Christopher L. DuMont. 36th Advanced Motion Imaging Conference, Feb. 7-9, 2002, Dallas, Texas.

Claudia Romanova et al. European Assoc. for Computer Graphics (Eurographics): "A VLSI Architecture for Anti-Aliasing" Advances in Computer Graphics Hardware 4. Hamburg, 1989. (Exact Date Not Specified), Proceedings of the Workshop On Graphics Hardware, Berlin, Springer, DE, vol. Workshop 4, 1991, pp. 75-90, XP000236347 *Sections 1-2*.

Glen L. Williams, Glenn Research Center, Cleveland, Ohio USA, "Sub-Nyquist Distortions in Sampled Data, Waveform Recording, and Video Imaging" NASA Technical Memorandum, 'Online! Oct. 2000, XP002287267, Retrieved from the Internet: URL:http://gltrs.grc.nasa.gov/reports/2000/TM-2000-210381.pdf> 'retrieved on Jul. 6, 2004! *the whole document*.

Roger A. Morton, Michelle A. Maurer, Christopher L. DuMont: "Assessing the Quality of Motion Picture Systems from Scene-to-Digital Data" SMPTE Journal, vol. 111, No. 2, Jun. 2002, pp. 85-96, XP001182323, p. 87 section "Selection of Metrics", p. 91, section "Analysis of Aliasing".

* cited by examiner

PARAMETRIC MEANS FOR REDUCING ALIASING ARTIFACTS

CROSS-REFERENCE TO RELATED APPLICATION

Reference is made to commonly assigned copending application Ser. No. 10/422,457, entitled "Method and System for Automatically Reducing Aliasing Artifacts" and filed on even date herewith in the name of Roger A. Morton, which is assigned to the assignee of this application.

FIELD OF THE INVENTION

This invention covers the field of digital imaging and motion picture imaging using digital methods.

BACKGROUND OF THE INVENTION

When properly designed, digital processing methods may be used effectively to enhance, store and transmit images. However, digital methods introduce artifacts including aliasing, missing code values, irreversible introduction of contours, and loss of data. More specifically, it has been shown that aliasing can occur at image frequencies below the Nyquist frequency of the sampling array used in the digital system (see Roger R. A. Morton, Michelle A. Maurer and Christopher L. DuMont, *SMPTE Conference Image Quality: Theory and Application Proceedings*, Dallas, Tex., Feb. 7–9, 2002). This means that objectionable artifacts are introduced into images at spatial frequencies normally not associated, given the capture parameters, with the aliasing effect. Many of these artifacts are particularly noticeable with motion picture images. Given such understanding, workable techniques are needed for reducing sub-Nyquist aliasing artifacts from the image output of digital systems, particularly from the motion output of digital motion systems.

SUMMARY OF THE INVENTION

The present invention is directed to overcoming one or more of the problems set forth above. Briefly summarized, according to one aspect of the present invention, the invention comprises a method for reducing the visibility of sub-Nyquist aliasing artifacts in an image, where the image is produced in a scene-to-output imaging system that is represented by a modulation transfer function. The method comprises the steps of: (a) providing a source image signal as an input image having sub-Nyquist aliasing artifacts, where image content is represented by an image frequency response and a frequency response amplitude; (b) determining a preferred aliasing ratio by utilizing an aliasing equation that depends on image frequency and pixel count of the imaging system; and (c) adjusting the frequency response amplitude of the image signal for image frequencies corresponding to the preferred aliasing ratio so as to correspondingly adjust the modulation transfer function of the scene to output system to maintain the preferred aliasing ratio while reducing the frequency response amplitude, thereby providing an image with reduced visibility artifacts.

While the aliasing is not always totally removed, the advantage of the method according to the present invention is that aliasing is rendered less visible in situations where it might otherwise be visible, all the while using a minimal amount of processing. Given that aliasing can occur at image frequencies below the Nyquist frequency of the sampling array, this invention reduces the frequency response of detail in areas where artifacts in the detail would be objectionable. The invention also provides a way of designing a modulation transfer function (MTF) response that offers maximum sharpness with minimal aliasing.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing aliasing reduction are well known, the present description will be directed in particular to attributes forming part of, or cooperating more directly with, a method in accordance with the present invention. Method attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer or a workstation of the type used in a post production facility to process motion picture film. Conse quently, the computer system will not be discussed in detail herein. It is also instructive to note that the images are either directly input into the computer system (for example by a digital camera) or digitized before input into the computer system (for example by scanning an original, such as a silver halide film).

Figure 4:
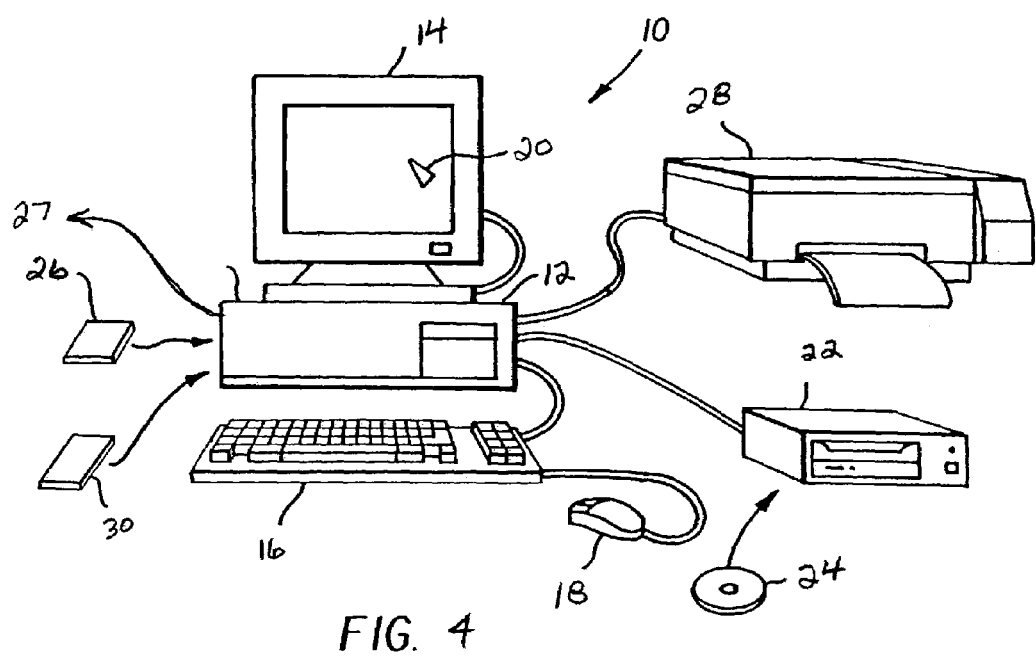
FIG. 4 is a perspective diagram of a computer system for implementing the present invention.

Referring first to FIG. 4, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 12 for receiving and processing software programs and for performing other processing functions. A display 14 is electrically connected to the microprocessor-based unit 12 for displaying user-related information associated with the software, e.g., by means of a graphical user interface. A keyboard 16 is also connected to the microprocessor based unit 12 for permitting a user to input information to the software. As an alternative to using the keyboard 16 for input, a mouse 18 may be used for moving a selector 20 on the display 14 and for selecting an item on which the selector 20 overlays, as is well known in the art.

A compact disk-read only memory (CD-ROM) 22 is connected to the microprocessor based unit 12 for receiving software programs and for providing a means of inputting the software programs and other information to the microprocessor based unit 12 via a compact disk 24, which typically includes a software program. In addition, a floppy disk 26 may also include a software program, and is inserted into the microprocessor-based unit 12 for inputting the software program. Still further, the microprocessor-based unit 12 may be programmed, as is well known in the art, for storing the software program internally. The microprocessor-based unit 12 may also have a network connection 27, such as a telephone line, to an external network, such as a local area network or the Internet. A printer 28 is connected to the microprocessor-based unit 12 for printing a hardcopy of the output of the computer system 10.

Images may also be displayed on the display 14 via a personal computer card (PC card) 30, such as, as it was formerly known, a PCMCIA card (based on the specifications of the Personal Computer Memory Card International Association) which contains digitized images electronically embodied in the card 30. The PC card 30 is ultimately inserted into the microprocessor based unit 12 for permitting visual display of the image on the display 14. Images may also be input via the compact disk 24, the floppy disk 26, or the network connection 27. Any images stored in the PC card 30, the floppy disk 26 or the compact disk 24, or input through the network connection 27, may have been obtained from a variety of sources, such as a digital camera (not shown) or a scanner (not shown). In accordance with the invention, the images are typically stored in a digital intermediate form obtained, e.g., by scanning a motion picture film with a telecine machine. Alternatively, the digital images could be digitally originated directly from a digital motion picture camera and transferred to the digital intermediate form.

This invention involves locating and reducing the visibility of sub-Nyquist aliasing artifacts by designing a modulation transfer (MTF) response that offers maximum sharpness with minimum aliasing. Inasmuch as it has been shown that aliasing can occur at image frequencies below the Nyquist frequency of the sampling array, the techniques disclosed herein can identify and address the presence of these artifacts.

Understanding the interaction between aliasing, limiting resolution and pixel count requires knowledge of the mechanisms that cause aliasing. To begin with, aliasing may be defined as "any artifact inserted into image data as a result of pixels interacting with scene content". From this definition, it can be understood that aliasing is scene dependent, and consequently there are scenes where aliasing is not visible. However, aliasing appears in many different ways in motion images, including artificial motion in high detail areas, pools of noise in textures, moving edges along isolated lines, or moving bands of lines across regular textures.

Aliasing effects are sometimes referred to as "basket weave", "alias contours", "shimmering", "fizzing", and "buzzing". Seen in many image areas including clothing, concrete and stone textures, grasses, and on the edges of lines, these artifacts often appear unexpectedly. In indoor and outdoor scenes, such artifacts appear on textures viewed straight on as the textures move or as their angle changes, as for example when textured material wraps around an arm or a shoulder. In addition, motion aliasing can produce surprising lines and colors that dance across regular scene patterns. Perceptually, this can be a serious problem as the human visual system is particularly alerted by motion. Aliasing effects, even in small regions, are thus immediately detectable by the human visual system.

Many methods are available to reduce aliasing artifacts below visually perceptible levels. The most robust involve increasing pixel count or reducing image detail. It is well known that artifacts are seen when their magnitude is such that they are perceptible to the viewer. Depending on their training and acuity, different viewers have different levels of perceptibility of artifacts. In addition, an individual viewer's position with respect to the display or projection screen will affect artifact perception. The literature on human vision discusses the threshold perception of viewers (see, for example, S. J. Anderson and D. C. Burr, "Spatial Summation Properties of Directionally selective Mechanisms in Human Vision", *J. Opt. Soc. Am. A,* 8: 1330–1339, August 1991).

Strewn along the path from scene-to-output are numerous opportunities for the loss of image quality and the introduction of artifacts. (A typical "scene-to-output" scenario is "scene-to-screen", which is defined as the path from the scene, which is presented to a camera on a movie set, to the cinema screen viewed by consumers. Other outputs may include a CRT screen, hardcopy printed output or other output displays.) Frequently, these opportunities to degrade the original image interact. One interaction, which relates to the subject matter of this application, produces aliasing artifacts from image content with frequencies below the Nyquist frequency of the pixel array, where the Nyquist frequency of the pixel array is defined as half the pixel frequency.

Although classical and historical Nyquist theory can be satisfied with ideal bandlimited filtering before sampling followed by ideal reconstruction after rendering, aliasing can and does occur in practice. At capture, aliasing occurs for numerous reasons. These include limited pixel resolution, the difficulty in implementing ideal bandlimiting, and because real world images are generally not stationary. At image display, aliasing is often due to resolution limitations and practical difficulties of achieving an accurate Nyquist reconstruction in digital cinema systems. Accordingly, although traditional Nyquist sampling requirements are satisfied, aliasing artifacts can still arise.

While intended for use with regard to any type of aliasing, the present invention is of particular use with respect to what is referred to as Type A aliasing. The ISO 12233 specification ("*ISO 12233: 2000 Photography—Electronic Still Picture Cameras—Resolution Measurements*", published Sep. 1, 2000) is used to define the measurement of Type A aliasing along light image lines, where this type of artifact relates to fluctuations in luminance along light image lines or between light image lines. With respect to the ISO 12233 specification, Type A aliasing occurs as fluctuations along the tilted lines of the standard ISO 12233 target. This type of aliasing appears as regular periodic fluctuating patterns in line brightness of luminance as the line crosses individual pixels. It has been found that Type A aliasing can insert significant aliasing artifacts in images having frequency components below the Nyquist frequency of the pixel array producing the image.

Notwithstanding this preferred usage of the invention, it is believed that the invention may also have utility for reducing the visibility of other types of aliasing, including fluctuations in luminance along dark image lines or between dark image lines, variations in image line-width, variations in image line edge position, additional lines added in various directions, and additional image noise due to scene components whose frequency is higher than the Nyquist frequency of the pixel pattern (which the inventor has classified in a forthcoming *SMPTE Journal* publication as Types B to F aliasing, respectively).

The method described herein involves using an aliasing equation that predicts an aliasing ratio as measured by the ISO 12233 standard and appears to predict the best unreconstructed aliasing performance for digital imaging systems, such as digital motion picture systems. More specifically, the aliasing equation for a lower limit of unreconstructed aliasing ratio verses image frequency is defined as $$\frac{1 - \cos(\pi K/2)}{1 + \cos(\pi K/2)} \quad (EQ. 1)$$

where K is the ratio of the image frequency to the Nyquist frequency of the pixel array. Significantly, this result depends only on image frequency and pixel count. This equation specifically predicts an aliasing ratio for Type A artifacts, but it is believed to have wider application for other types of aliasing as described above. This equation indicates that for systems with the same frequency response amplitude, lowering aliasing ratios improve image quality. Furthermore, and of importance for this invention, reducing frequency response amplitude reduces visible aliasing, however at the expense of reducing sharpness and generally limiting resolution.

For on-screen measurements, Nyquist frequency is defined in terms of the pixels of the electronic projector, the pixels the recorder used to write the film that is being projected, or the least pixel frequency in the system (unless appropriate reconstruction is used during pixel scale-up). As mentioned above, the Nyquist frequency is defined as half the pixel frequency of the pixel array used in the generation of the image.

The aliasing ratio as defined in the ISO12233 standard is the ratio between the amplitude fluctuation of the white level of tilted black and white lines (amplitude of fluctuations) to the amplitude of the black and white lines (signal amplitude), as follows Aliasing ratio=amplitude of fluctuations/signal amplitude  (EQ. 2)

(The aliasing ratio is 100% at signal frequencies equal to the Nyquist frequency of the pixel array.) Thus, to determine the amplitude of these aliasing fluctuations of the white lines, it is necessary to multiply the aliasing ratio by the signal amplitude:

Amplitude of fluctuations=aliasing ratio×signal amplitude  (EQ. 3)

Thus, by reducing the signal amplitude for a constant aliasing ratio, the amplitude of the aliasing is proportionately reduced.

One way to reduce the amplitude, as described in the cross-referenced U.S. patent application Ser. No. 10/422,457, involves modeling artifact perception and then modifying the images for those areas where the artifact is predicted by the model to be visible. In some cases, the modification of the image may simply involve reducing the contrast in the area where the perceptible artifact is present. In other cases, more complex removal methods may involve identifying the artifact, using the source signal frequency and the scanning pixel pattern for predicting the artifact frequency components, and then removing those frequency components from the image in the region of the artifact.

However, as described in the present application, another way to ensure the amplitude never exceeds a given level is to ensure that the modulation transfer function (MTF) of the system from scene to screen is such that the amplitude of any scene content is reduced below that level for the image frequencies represented by the aliasing ratio. In many scenes, virtually all the scene content (but not all scene content) falls between zero and 100% diffuse reflectance, reducing the modulation transfer function at a given frequency K to an amplitude such that the aliasing fluctuations are not visible can achieve aliasing suppression. Superficially, if fluctuations due to type A aliasing fall below a given percentage reflectance, for example some value between 0.2% and 1%, it is possible to adjust the shape of the MTF response based on the aliasing equation to ensure that the processed image falls at or below that value.

In other words, referring to EQ. 2, let the signal amplitude represent the amplitude of the scene content and let the amplitude fluctuations represent the maximum allowable type A aliasing. Equation (2) is then rearranged as follows:

Amplitude of scene content=maximum Type A aliasing/aliasing ratio  (EQ.4)

Furthermore, the equation for the aliasing ratio is given by EQ. 1 and the amplitude of the scene content is controlled by the MTF shape. Thus, the desired MTF shape is given by the maximum allowable type A aliasing M divided by the aliasing ratio given in the equation (EQ. 1) above. Accordingly, by choosing filtering and other MTF adjustment means in a scene to output system (where an output may be a projection screen, CRT display, printed output or other display means) the scene to output MTF may be adjusted to achieve an aliasing level as defined by the aliasing equation, thereby lowering the visibility of aliasing artifacts.

Figure 3:
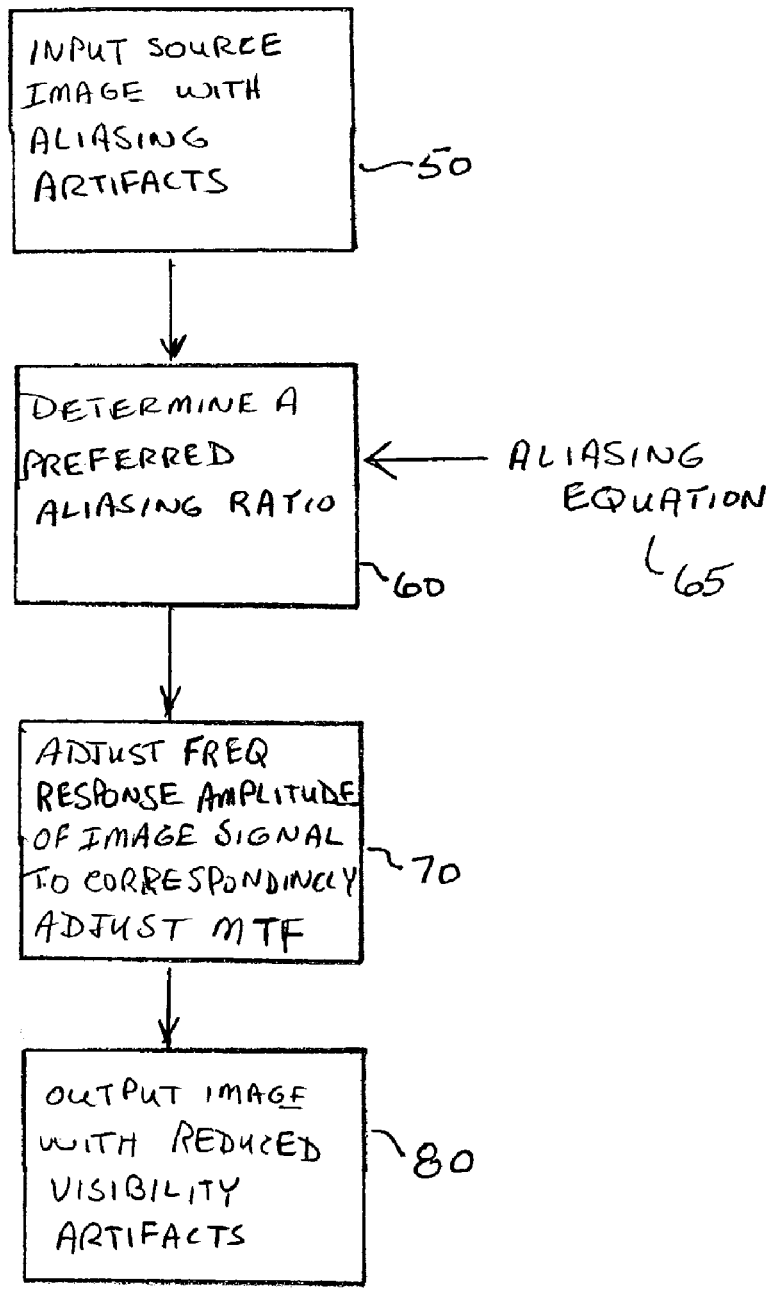
FIG. 3 shows a block diagram of the process for reducing the visibility of artifacts according to the invention.

Referring to FIG. 3, a bock diagram of a parametric method for reducing the visibility of sub-Nyquist aliasing artifacts in an image is shown, where the image is produced in a scene-to-output imaging system that is represented by a modulation transfer function. In a stage 50, a source image signal is provided as an input image having sub-Nyquist aliasing artifacts, where image content is represented by parameters including an image frequency response and a frequency response amplitude. A preferred aliasing ratio is determined in a stage 60 by utilizing an aliasing equation 65 that depends on image frequency and pixel count of the imaging system. In the preferred embodiment, the aliasing equation is given by Equation (1). Then the frequency response amplitude of the image signal is adjusted in a parametric adjustment stage 70 for image frequencies corresponding to the preferred aliasing ratio. This adjustment causes a corresponding adjustment in the modulation transfer function of the scene to output system to maintain the preferred aliasing ratio while reducing the frequency response amplitude, thereby providing in a stage 80 an image with reduced visibility artifacts.

There are of course numerous ways to adjust overall MTF from scene to output in the parametric adjustment stage 70. These include without limitation digital filtering means and other image processing means, scanning apertures, recording or display apertures, lens MTF and similar techniques.

Figure 1:
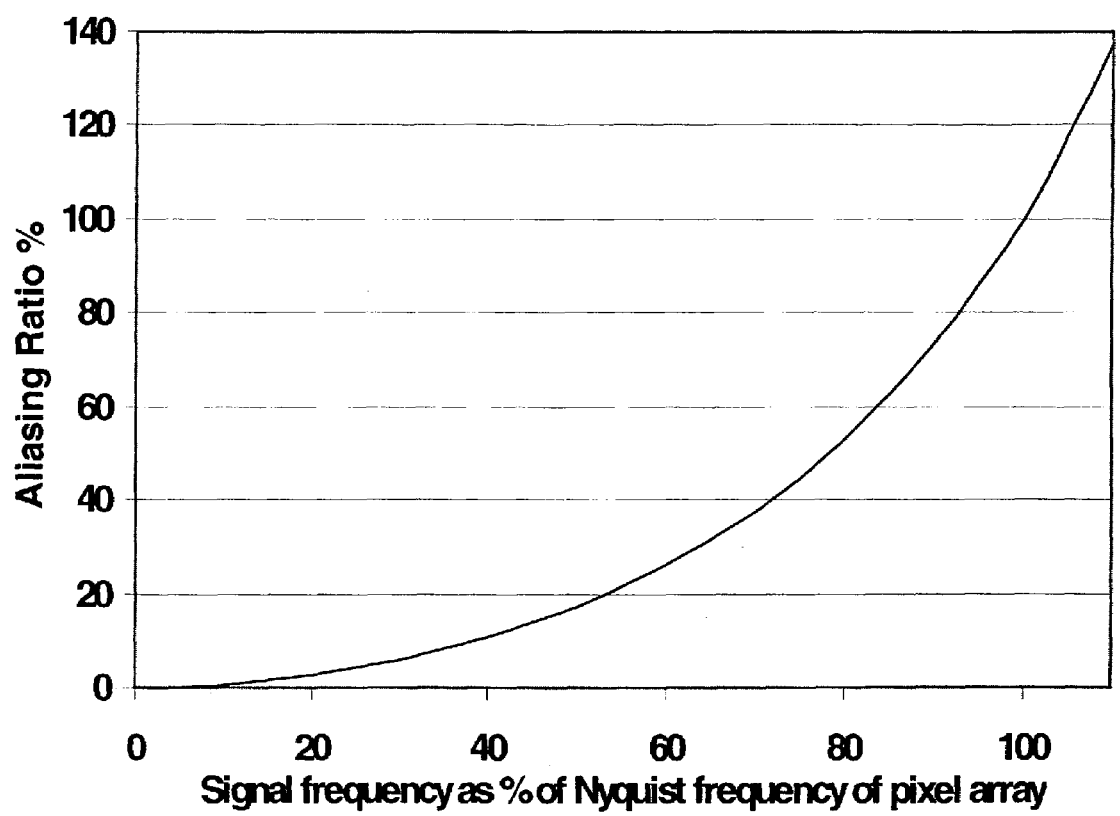
FIG. 1 is a plot showing the form of the aliasing equation implemented according to the teaching of the invention.

FIG. 1 shows the form of the aliasing equation, where the aliasing ratio is plotted versus image frequency expressed as a percent of the Nyquist frequency, and where the Nyquist frequency is defined as one half the pixel frequency. Equation (1) gives the equation for the curve shown in FIG. 1, where K=image frequency expressed as a percent of the Nyquist frequency. It will be appreciated that Nyquist frequency changes with image frequency orientation and that Nyquist frequency expressed in spatial terms may be different in the vertical and horizontal directions.

Figure 2:
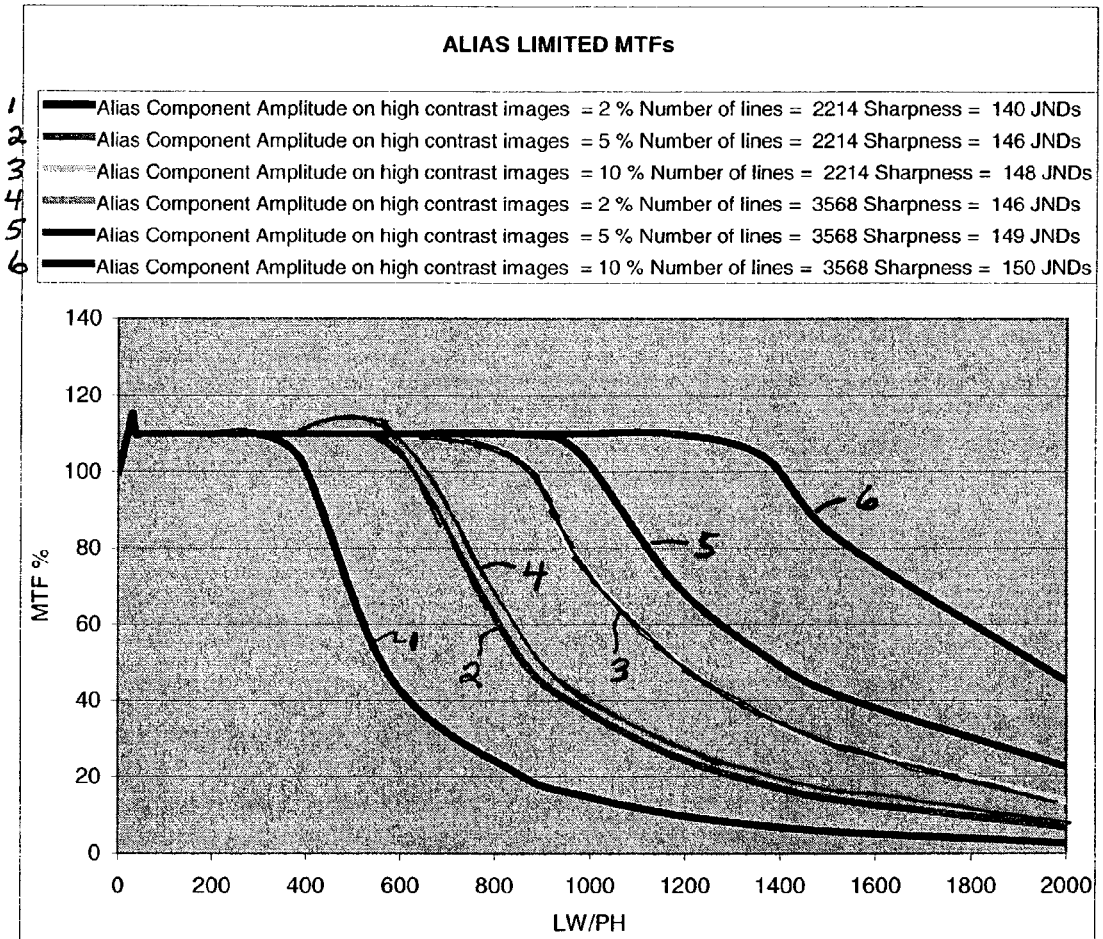
FIG. 2 is a plot showing an example of a modulation transfer function (MTF) where the MTF has been adjusted over its entire range in accordance with both maximum overshoot criteria as well as aliasing ratio criteria. In this plot, the MTF curves are drawn for different aliasing ratios and for different scan line formats.

FIG. 2 shows an example of an MTF where the MTF has been adjusted over its entire range in accordance with both maximum overshoot criteria as well as aliasing ratio criteria. (As employed in FIG. 2, the terminology used by the ISO 12233 standard for the frequency of image features is line widths per picture height (LW/PH)). In this case, the MTF curves are drawn for different aliasing ratios (alias component amplitudes expressed as percentages) and for different scan line formats (number of lines). Sharpness based on a measure of perceptual sharpness (sharpness=JNDs, or Just Noticeable Differences) of each MTF curve is also indicated. This enables the system designer to adjust the MTF shape to meet various criteria including aliasing level.

It will however be appreciated that many other criteria may be used in selecting the shape of the MTF. Furthermore, an MTF may be selected that changes with signal amplitude, with color or with the excursion across image details. These excursions involve extremes that lie in different parts of the system's color gamut. Thus, the MTF may be defined not only as a function of spatial frequency or frequencies but also as a function of the color coordinate variables at the beginning and the color coordinate variables at the end of the excursion. This can result in an MTF function based of at least seven variables (namely, for example, frequency, $R_1$, $G_1$, $B_1$, $R_2$, $G_2$ and $B_2$—where the subscript 1 refers to the initial image value and the subscript 2 refers to the subsequent image value). Furthermore, the rate change of MTF from pixel to pixel may be limited so that boundary effects, rapidly changing grain levels, and similar artifacts are not introduced.

The invention has been described with reference to one or more preferred embodiments. However, it will be appreciated that variations and modifications can be effected by a person of ordinary skill in the art without departing from the scope of the invention.

PARTS LIST

10 computer system
12 microprocessor-based unit
14 display
16 keyboard
18 mouse
20 selector
22 CD-ROM
24 CD
26 floppy disk
27 network connection
28 printer
30 PC card
50 input stage
60 preferred aliasing ratio determination stage
65 aliasing equation
70 parametric adjustment stage
80 output stage

What is claimed is:

1. A method for reducing the visibility of sub-Nyquist aliasing artifacts in an image, where the image is produced in a scene-to-output imaging system that is represented by a modulation transfer function, said method comprising the steps of:
   (a) providing a source image signal as an input image having sub-Nyquist aliasing artifacts, where image content is represented by an image frequency response and a frequency response amplitude;
   (b) determining a preferred aliasing ratio by utilizing an aliasing equation that depends on image frequency and pixel count of the imaging system; and
   (c) adjusting the frequency response amplitude of the image signal for image frequencies corresponding to the preferred aliasing ratio so as to correspondingly adjust the modulation transfer function of the scene to output system to maintain the preferred aliasing ratio while reducing the frequency response amplitude, thereby providing an image with reduced visibility artifacts.

2. The method as claimed in claim 1 wherein the predetermined aliasing equation in step (b) is represented by $$\frac{1 - \cos(\pi K/2)}{1 + \cos(\pi K/2)}$$

where $K$ is the ratio of the image frequency to the Nyquist frequency of the imaging system.

3. The method as claimed in claim 1 wherein the step (c) of adjusting comprises the step of filtering the image signal with a digital filter.

4. A computer program product for reducing the visibility of sub-Nyquist aliasing artifacts in an image, where the image is produced in a scene-to-output imaging system that is represented by a modulation transfer function, comprising: a computer readable storage medium having a computer program stored thereon for performing the steps of:
   (a) providing a source image signal as an input image having sub-Nyquist aliasing artifacts, where image content is represented by an image frequency response and a frequency response amplitude;

(b) determining a preferred aliasing ratio by utilizing an aliasing equation that depends on image frequency and pixel count of the imaging system; and (c) adjusting the frequency response amplitude of the image signal for image frequencies corresponding to the preferred aliasing ratio so as to correspondingly adjust the modulation transfer function of the scene to output system to maintain the preferred aliasing ratio while reducing the frequency response amplitude, thereby providing an image with reduced visibility artifacts.

5. The computer program product as claimed in claim 4 wherein the predetermined aliasing equation in step (b) is represented by $$\frac{1-\cos(\pi K/2)}{1+\cos(\pi K/2)}$$

where $K$ is the ratio of the image frequency to the Nyquist frequency of the imaging system.

6. The computer program product as claimed in claim 4 wherein the step (c) of adjusting comprises the step of filtering the image signal with a digital filter.

* * * * *

UNITED STATES PATENT AND TRADEMARK OFFICE
CERTIFICATE OF CORRECTION

PATENT NO. : 7,171,055 B2 Page 1 of 1
APPLICATION NO. : 10/422099
DATED : January 30, 2007
INVENTOR(S) : Roger R. Morton It is certified that error appears in the above-identified patent and that said Letters Patent is hereby corrected as shown below:

Claim 2, Column 8, Line 52   In Claim 2, after "where" delete "$^{K}$" and insert -- K --, therefor.

Claim 5, Column 10, Line 7   In Claim 5, after "where" delete "$^{K}$" and insert -- K --, therefor.

Signed and Sealed this

Fourteenth Day of August, 2007

JON W. DUDAS
*Director of the United States Patent and Trademark Office*